（12） United States Patent
Drozd

(10) Patent No.: US 8,871,163 B2
(45) Date of Patent: Oct. 28, 2014

(54) VANADIUM OXIDE PURIFICATION PROCESS

(71) Applicant: American Vanadium Corp., Vancouver (CA)

(72) Inventor: Michael Adam Drozd, Elko, NV (US)

(73) Assignee: American Vanadium Corp., Vancouver (CA)

( * ) Notice: Subject to any disclaimer, the term of this patent is extended or adjusted under 35 U.S.C. 154(b) by 0 days.

(21) Appl. No.: 13/839,136

(22) Filed: Mar. 15, 2013

(65) Prior Publication Data

US 2014/0079609 A1 Mar. 20, 2014

Related U.S. Application Data

(60) Provisional application No. 61/702,637, filed on Sep. 18, 2012.

(51) Int. Cl.
| | | |
|---|---|---|
| *C01G 31/00* | (2006.01) | |
| *C01G 31/02* | (2006.01) | |
| *B01J 39/16* | (2006.01) | |
| *B01D 11/00* | (2006.01) | |
| *B01J 39/00* | (2006.01) | |

(52) U.S. Cl.
CPC .............. *C01G 31/02* (2013.01); *B01D 11/00* (2013.01); *B01J 39/165* (2013.01); *B01J 39/00* (2013.01)

USPC ........................... 423/63; 423/62; 423/594.17

(58) Field of Classification Search
CPC ....................................................... C01G 31/02
USPC ............................................................ 423/63
See application file for complete search history.

(56) References Cited

U.S. PATENT DOCUMENTS

| | | | |
|---|---|---|---|
| 5,332,531 A | 7/1994 | Horwitz | |
| 6,358,307 B1 * | 3/2002 | Legrand et al. | 106/479 |

FOREIGN PATENT DOCUMENTS

| | | |
|---|---|---|
| CN | 102430266 A | 5/2012 |
| JP | 2007-112666 A | 5/2007 |
| KR | 10-2002-0036579 A | 5/2002 |

OTHER PUBLICATIONS

International Search Report and Written Opinion mailed Dec. 12, 2013, issued in corresponding International Application No. PCT/US2013/060193, filed Sep. 17, 2013, 11 pages.

Zeng, Li, et al., "Extraction of Vanadium From the Leach Solution of Stone Coal Using Ion Exchange Resin," Hydrometallurgy 97(3-4):194-197, Jul. 2009.

* cited by examiner

*Primary Examiner* — Melissa Stalder
(74) *Attorney, Agent, or Firm* — Christensen O'Connor Johnson Kindness PLLC

(57) ABSTRACT

Process for purifying vanadium oxide that includes cationic exchange resin and solvent extraction.

16 Claims, 6 Drawing Sheets

VANADIUM OXIDE PURIFICATION PROCESS

CROSS-REFERENCE TO RELATED APPLICATION

This application claims the benefit of U.S. Patent Application No. 61/702,637, filed Sep. 18, 2012, expressly incorporated herein by reference in its entirety.

BACKGROUND OF THE INVENTION

Vanadium oxide is a valuable material that finds utility as an electrolyte for batteries. Conventional processing methods for providing high purity vanadium oxide are time and energy consuming as well as expensive.

Heap leaching is a conventional method for economically extracting metals, such as vanadium, from low grade ores. Heap leaching simply involves piling raw ore, taken directly from an ore deposit, into very large heaps that vary in height. The heap is formed upon a prepared relatively flat base formed from a composite of materials impermeable to the leach solution. A leaching solution is introduced upon the top of the heap and percolates down through the heap. The effluent liquor passes into perforated drain pipes (situated on top of the impermeable liner and bottom of material) arranged on the surface of the base beneath the heap. The drain pipes direct the effluent liquor into pond where a pump sends the solution to a header for transport to a processing plant where the metal of interest is separated from the effluent and recovered. Because the heap drains well compared to conventional tailings pond, the heap can be left as an environmentally acceptable tailings site and any required reclamation work can be done immediately after the extraction is completed.

Because of the increased demand for vanadium oxide, there exists a need for an effective and efficient process for providing vanadium oxide in a high purity. The present invention seeks to fulfill this need and provides further related advantages.

SUMMARY OF THE INVENTION

In one aspect, the invention provides a process for purifying vanadium oxide ($VO_2^+$) and providing a vanadium oxide solution in water.

In one embodiment, the process includes:

(a) loading vanadium oxide on a cationic exchange resin by contacting a first vanadium oxide-containing aqueous solution with the resin to provide a cationic exchange resin loaded with vanadium oxide;

(b) stripping vanadium oxide from the cationic resin loaded with vanadium oxide by contacting the cationic exchange resin loaded with vanadium oxide with acid to regenerate the resin and to provide a second vanadium oxide-containing aqueous solution, wherein the concentration of vanadium oxide in the second solution relative to other cationic metals is greater than in the first solution;

(c) extracting the second vanadium oxide-containing aqueous solution with an organic solvent comprising a chelating agent to provide an aqueous solution and an organic solvent containing vanadium oxide;

(d) separating the organic solvent containing vanadium oxide from the aqueous solution; and (e) releasing vanadium oxide from the organic solvent by contacting the organic solvent containing vanadium oxide with an aqueous solution to provide a third vanadium oxide-containing aqueous solution, wherein the concentration of vanadium oxide in the third solution relative to other cationic metals is greater than in the second solution.

In one embodiment, the above method includes a second stage solvent extraction. In this embodiment, the process further includes:

(f) extracting the third vanadium oxide-containing aqueous solution with an organic solvent comprising a chelating agent to provide an aqueous solution and an organic solvent containing vanadium oxide;

(g) separating the organic solvent containing vanadium oxide from the aqueous solution; and (h) releasing vanadium oxide from the organic solvent by contacting the organic solvent containing vanadium oxide with an aqueous solution to provide a fourth vanadium oxide-containing aqueous solution, wherein the concentration of vanadium oxide in the fourth solution relative to other cationic metals is greater than in the third solution.

In another embodiment, the above method includes a third stage solvent extraction. In this embodiment, the process further includes:

(i) extracting the fourth vanadium oxide-containing aqueous solution with an organic solvent comprising a chelating agent to provide an aqueous solution and an organic solvent containing vanadium oxide;

(j) separating the organic solvent containing vanadium oxide from the aqueous solution; and (k) releasing vanadium oxide from the organic solvent by contacting the organic solvent containing vanadium oxide with an aqueous solution to provide a fifth vanadium oxide-containing aqueous solution, wherein the concentration of vanadium oxide in the fifth solution relative to other cationic metals is greater than in the fourth solution.

In another aspect of the invention, a vanadium oxide product (e.g., an aqueous vanadium oxide solution) is provided. The vanadium oxide product is prepared by the process of the invention.

DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION OF THE INVENTION

Figure 1:
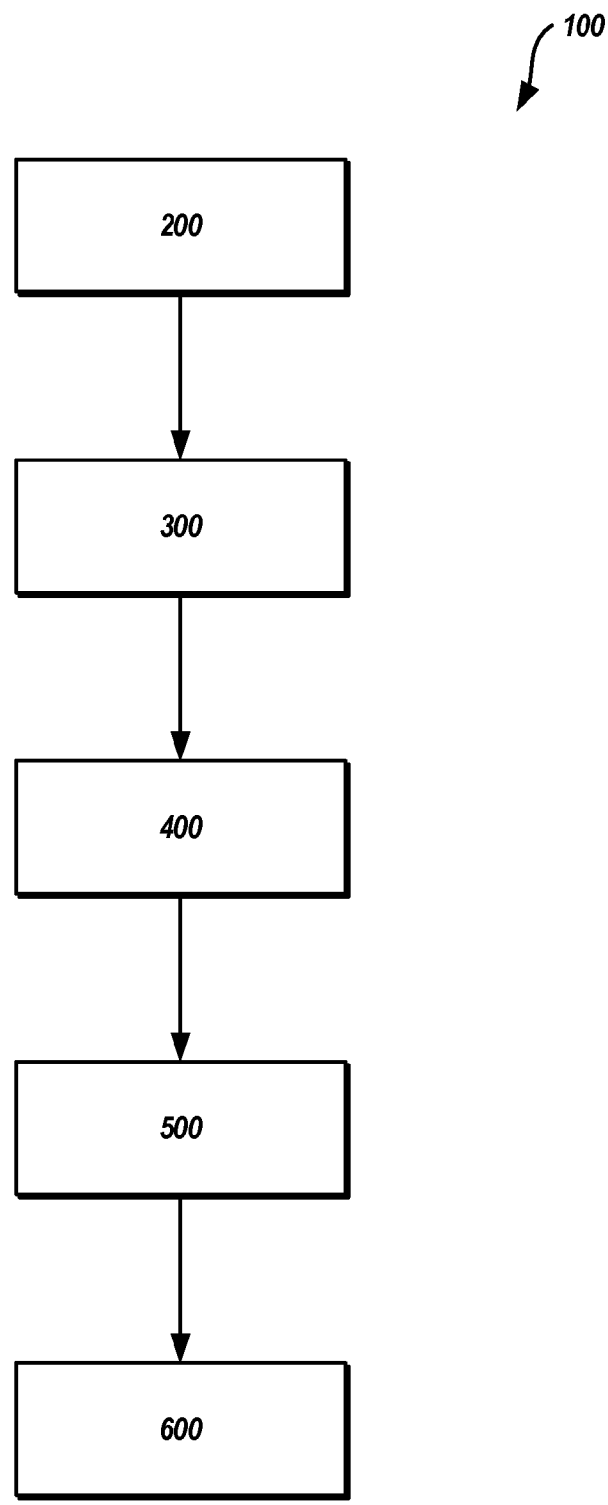
FIG. 1 is a flow chart illustrating a representative method of the invention that includes ion exchange and optional solvent extraction (100); heap leaching (200); cationic exchange (300); first product extraction (400); second product extraction (500); and third product extraction (600).

The present invention relates to a process for purifying vanadium oxide and more particularly to a process that includes the use of a cationic exchange resin to purify vanadium oxide. A purified vanadium oxide product produced by the process is also provided.

In one aspect, the invention provides a process for purifying vanadium oxide ($VO_2^+$) and providing an aqueous vanadium oxide solution that is effective for use as an electrolyte in a battery.

The vanadium oxide purification process includes ion exchange and solvent extraction steps.

In one embodiment, the process includes:

(a) loading vanadium oxide on a cationic exchange resin by contacting a first vanadium oxide-containing aqueous solution with the resin to provide a cationic exchange resin loaded with vanadium oxide;

(b) stripping vanadium oxide from the cationic resin loaded with vanadium oxide by contacting the cationic exchange resin loaded with vanadium oxide with acid to regenerate the resin and to provide a second vanadium oxide-containing aqueous solution, wherein the concentration of vanadium oxide in the second solution relative to other cationic metals is greater than in the first solution;

(c) extracting the second vanadium oxide-containing aqueous solution with an organic solvent comprising a chelating agent to provide an aqueous solution and an organic solvent containing vanadium oxide;

(d) separating the organic solvent containing vanadium oxide from the aqueous solution; and (e) releasing vanadium oxide from the organic solvent by contacting the organic solvent containing vanadium oxide with an aqueous solution to provide a third vanadium oxide-containing aqueous solution, wherein the concentration of vanadium oxide in the third solution relative to other cationic metals is greater than in the second solution.

In a representative heap leaching process, a vanadium-containing ore is subjected to a leach solvent. Typical leach solvents include primarily sulfuric acid. However, hydrochloric and/or nitric acids can also be used, for example, in combination with sulfuric acid.

In the above process, the step of loading vanadium oxide on a cationic exchange resin to provide a cationic exchange resin loaded with vanadium oxide includes contacting a first vanadium oxide-containing aqueous solution with the resin. The first vanadium oxide-containing aqueous solution is an aqueous solution produced from a vanadium-containing ore subjected to heap leaching. The first vanadium oxide-containing solution can include from 1000 to 80,000 ppm vanadium. The first vanadium oxide-containing aqueous solution can further include other metal cations such as iron, zinc, and aluminum, and to a lesser extent sodium, potassium, cadmium, calcium, uranium, nickel, arsenic, antimony, mercury, copper, barium, magnesium, manganese, molybdenum, lead, titanium, zirconium, and strontium ions. The first vanadium oxide-containing aqueous solution can also include anions such as sulfate, phosphate, and chloride.

Prior to contact with the resin, the leach solution (e.g., 10 to 10,000 ppm V) can be subjected to one or more solvent extraction stages in which aqueous vanadium oxide to converted to organic vanadium oxide [$VO_2^+$(aq)+Org->($VO_2^+$ org)] (pH range for the solvent extraction is 5 to 50 g/L $H_2SO_4$) followed by regeneration of aqueous vanadium oxide from the organic vanadium oxide [($VO_2^+$ org)->$VO_2^+$(aq)+Org] (pH range for the release is 50 to 500 g/L $H_2SO_4$). The pH requirement for resin loading of the vanadium oxide is a free acid range of 10 to 60 g/l $H_2SO_4$ (e.g., 4.8 mg V/g resin).

Suitable cationic exchange resins include strong cationic exchange resins such as hydrogen or sodium cationic exchange resins. Representative cationic exchange resins include C-211, C-373, C-381, and C361 commercially available from Siemens; Lewatit S-2565, Lewatit S-1467, Lewatit S1468, Lewatit S-2538, Lewatit S-2528, Lewatit C-249, Ionac C-249NS, Ionac C-253, and Ionac C-266 commercially available from Performance Chemical; C-100, C-145, C-150, and C-160 commercially available from Purolite; and Amberlite IRC748, Amberlite IR 120, Amberjet 1200, Amberjet 1300, Amberjet 1500, Amberjet 1600, and HCR-S commercially available from Rohm Hass/Dow.

As used herein, the term "ion exchange resin" refers to an insoluble matrix (or support structure) normally in the form of small (1-2 mm diameter) beads fabricated from an organic polymer substrate. The matrix has a highly developed structure of pores on the surface of which are sites with easily trapped and released ions. The trapping of ions takes place only with simultaneous releasing of other ions; thus the process is called ion exchange. There are multiple different types of ion-exchange resin which are fabricated to selectively prefer one or several different types of ions. Cation exchange resins are insoluble organic polymer having negatively charged radicals attached to it that can attract and hold cations in a surrounding solution. Ion-exchange resins can be based on crosslinked polystyrene. The required active groups can be introduced after polymerization or incorporated into monomers pre-polymerization. For example, the crosslinking is often achieved by adding 0.5-25% of divinylbenzene to stryene at the polymerization process. Non-crosslinked polymers are used only rarely because they are less stable. Crosslinking decreases ion-exchange capacity of the resin and prolongs the time needed to accomplish the ion exchange processes. Resin used are 4 to 12% cross-linked gel cation resins for demineralization and softening applications.

The cationic resin loaded with vanadium oxide can be washed (aqueous) prior to vanadium oxide stripping to remove residual sulfuric acid, anions, and extraneous metal cations.

In the above process, stripping vanadium oxide from the cationic resin loaded with vanadium oxide to regenerate the resin and to provide a second vanadium oxide-containing aqueous solution includes contacting the cationic exchange resin loaded with vanadium oxide with acid [($VO_2^+$ resin)+$H^+$ acid->$VO_2^+$(aq) and H-strong cationic resin]. The pH requirement for resin stripping of the vanadium oxide is a free acid range of 25 to 200 g/l $H_2SO_4$. The concentration of vanadium oxide in the second solution relative to other cationic metals is greater than in the first solution.

In the above process, extracting the second vanadium oxide-containing aqueous solution to provide an aqueous solution and an organic solvent containing vanadium oxide comprises extraction of the aqueous solution with an organic solvent that includes a chelating agent. In the solvent extraction, aqueous vanadium oxide to converted to organic vanadium oxide [$VO_2^+$(aq)+Org->($VO_2^+$ org)] (pH range for the solvent extraction is 5 to 50 g/L $H_2SO_4$) followed by regeneration of aqueous vanadium oxide from the organic vanadium oxide [($VO_2^+$ org)->$VO_2^+$(aq)+Org] (pH range for the release is 50 to 500 g/L $H_2SO_4$).

Suitable chelating agents include organophosphoric acids. In one embodiment, the chelating agent is 2-diethylhexaphosphoric acid.

Suitable organic solvents include hydrocarbons and hydrocarbon mixtures. Representative organic solvents include SX-12, substitutes SX-1, SX-7, SX-10, SX-11, SX-18, SX-80, Shell Sol 2325 (Shell Chemical), Conoco 170E (Conoco), Escaid 100 and Escaid 110 (Exxon), and Napoleum 470B (Kerr McGee). In one embodiment, the solvent is a solvent extraction compatible kerosene. The organic solvent can further include a modifier such as tri-n-octylphosphine oxide (or equivalent, such as Cytec 923).

Once the vanadium oxide is extracted into the organic solvent, the organic solvent containing vanadium oxide is separated from the aqueous solution and then vanadium oxide is released from the organic solvent to provide a third vanadium oxide-containing aqueous solution. Release is achieved by contacting the organic solvent containing vanadium oxide with an aqueous solution. The pH requirement for release of the vanadium oxide is a free acid range of 100 to 300 g/l $H_2SO_4$. The concentration of vanadium oxide in the third solution relative to other cationic metals is greater than in the second solution.

In another aspect, the method of the invention further includes one or more additional solvent extraction stages. In one embodiment, the above method includes a second stage solvent extraction. In this embodiment, the process further includes:

(f) extracting the third vanadium oxide-containing aqueous solution with an organic solvent comprising a chelating agent to provide an aqueous solution and an organic solvent containing vanadium oxide;

(g) separating the organic solvent containing vanadium oxide from the aqueous solution; and (h) releasing vanadium oxide from the organic solvent by contacting the organic solvent containing vanadium oxide with an aqueous solution to provide a fourth vanadium oxide-containing aqueous solution, wherein the concentration of vanadium oxide in the fourth solution relative to other cationic metals is greater than in the third solution.

In another embodiment, the above method includes a third stage solvent extraction. In this embodiment, the process further includes:

(i) extracting the fourth vanadium oxide-containing aqueous solution with an organic solvent comprising a chelating agent to provide an aqueous solution and an organic solvent containing vanadium oxide;

(j) separating the organic solvent containing vanadium oxide from the aqueous solution; and (k) releasing vanadium oxide from the organic solvent by contacting the organic solvent containing vanadium oxide with an aqueous solution to provide a fifth vanadium oxide-containing aqueous solution, wherein the concentration of vanadium oxide in the fifth solution relative to other cationic metals is greater than in the fourth solution.

The organic solvent, chelating agent, and pH requirements for the second and third solvent extraction stages can be as described above in the single solvent extraction process.

In certain embodiments, the product vanadium oxide-containing aqueous solution is a 6% by weight vanadium oxide in water. This product can be obtained from a continuous process that utilizes recycling of the strip solution until the proper concentration is obtained, the solution is then advanced to the next process. Concentration ratios are between 100 to 300 times feed concentration.

In certain embodiments, the product vanadium oxide-containing aqueous solution includes less than 100 ppm other cationic metals. This product can be obtained from three separate solvent exchange processes that included four (4) extraction, two (2) strip, one (1) hydrochloric acid wash, and one (1) water wash.

A representative method of the invention is illustrated in FIGS. 1-6. The illustrated representative method includes three extraction stages. It will be appreciates that methods of the invention include one or more extraction stages (e.g., 1, 2, 3, 4, or 5).

FIG. 1 is a flow chart illustrating a representative method of the invention that includes ion exchange and optional solvent extraction (100); heap leaching (200); cationic exchange (300); first product extraction (400); second product extraction (500); and third product extraction (600).

Figure 2:
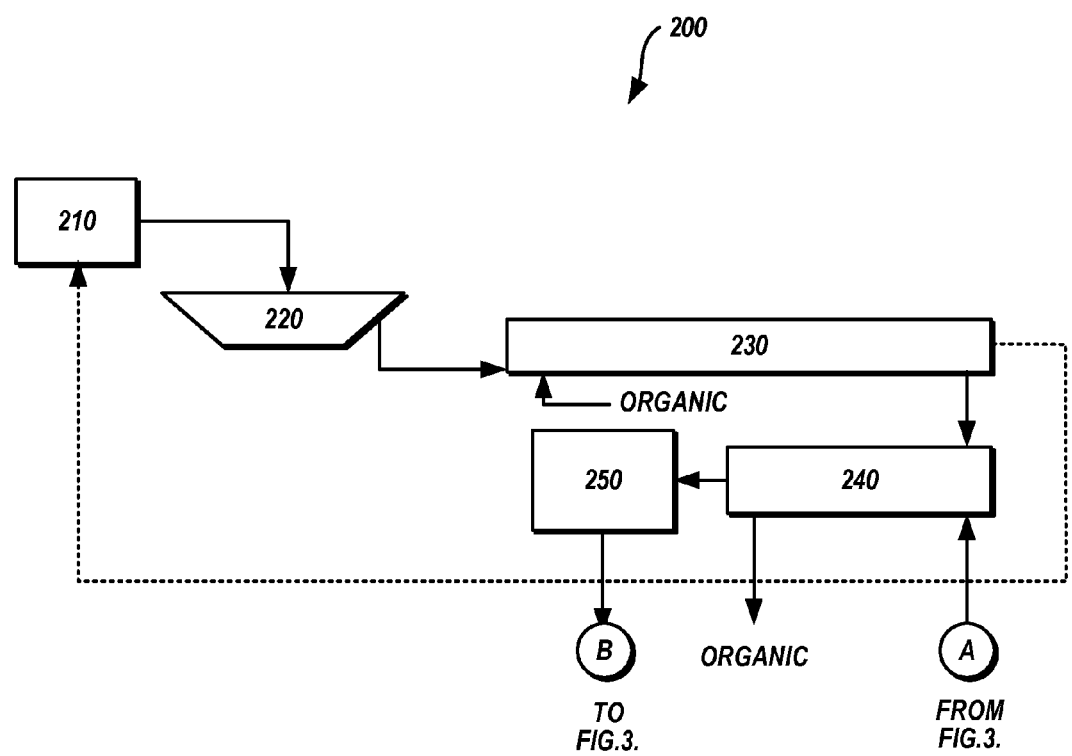
FIG. 2 is a schematic illustration of heap leaching step 200.

FIG. 2 illustrates heap leaching step 200. Method 200 includes the steps of subjecting a vanadium-containing ore to heap leaching to provide a vanadium oxide-containing aqueous solution. Optionally, the vanadium oxide-containing aqueous solution (i.e., leach solution) can be subjected to one or more solvent extraction stages in which aqueous vanadium oxide is converted to organic vanadium oxide followed by separation from the aqueous phase and regeneration of aqueous vanadium oxide from the vanadium oxide-containing organic phase. Referring to FIG. 2, heap 210 is subject to leaching to provide an initial leach solution that can be stored in pond 220. The leach solution from pond 220 can be optionally subject to extraction with an organic solvent in extraction mixer-settler 230 to provide an organic phase that includes the extracted vanadium oxide and an aqueous phase that can be directed back to the heap. The vanadium-oxide containing organic phase is then directed to strip mixer-settler 240 that effects redistribution of the vanadium oxide into the aqueous phase (acid treatment). The vanadium oxide-containing aqueous phase is then directed to ion exchange step 300. The organic phase from strip mixer-settler 240 can be directed back to extraction mixer-settler 230. The vanadium oxide-containing aqueous phase from the strip mixer-settler can be stored in strip solution tank 250 prior to directing the vanadium oxide-containing aqueous phase to ion exchange step 300.

Figure 3:
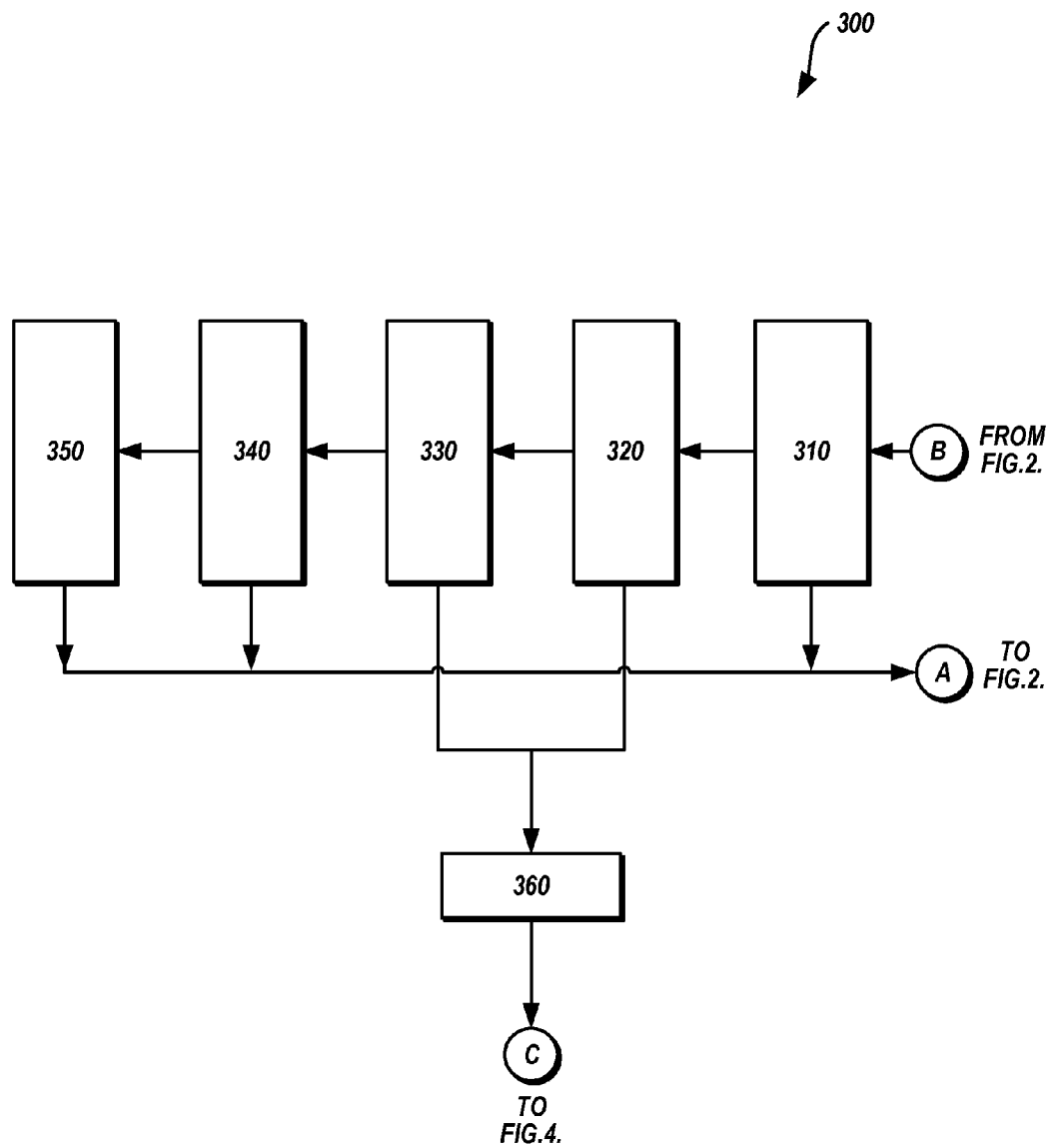
FIG. 3 is a schematic illustration of ion exchange step 300.

FIG. 3 illustrates ion exchange step 300. Referring to FIG. 3, step 300 includes contacting the vanadium oxide-containing aqueous phase from step 200 with a cationic exchange resin to provide a cationic exchange resin loaded with vanadium oxide (310). The effluent from the loading can be returned to step 200. After resin loading with vanadium oxide, vanadium oxide is then stripped from the cationic exchange resin to provide a vanadium oxide-containing aqueous phase, which is directed to extraction step 400. The cationic resin can be stripped with one or more acid treatments to provide the vanadium oxide-containing aqueous phase acid stripped resins (e.g., first acid stripped resin 320 and second acid stripped resin 330). The stripped vanadium oxide (in aqueous phase) can be stored in holding tank 360 prior to the extraction stage(s). It will be appreciated that more than two acid stripping steps can be performed. The acid stripped exchange resins can be washed with water to provide water-washed resin 340, which then returns the cationic exchange resin to standby (resin 350) and ready for a subsequent vanadium oxide capture and loading.

Figure 4:
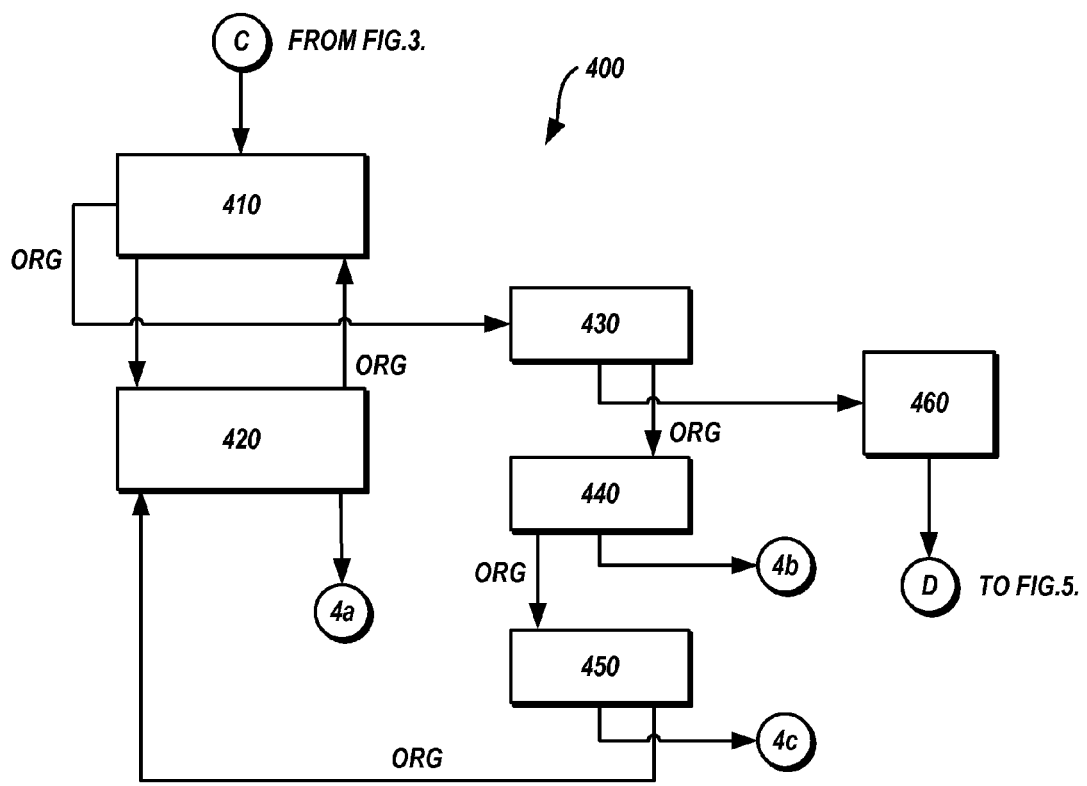
FIG. 4 is a schematic illustration of first extraction step 400.

FIG. 4 illustrates first extraction step 400. Referring to FIG. 4, step 400 includes introducing the vanadium oxide-containing aqueous phase from FIG. 3 (C) to product extraction mixer-settler 410 where the vanadium oxide is extracted into an organic phase. The vanadium oxide-containing organic phase is directed to product stripper 430 that effects redistribution of the organic vanadium oxide into the aqueous phase (acid treatment). The vanadium oxide-containing aqueous phase is then directed to second extraction step 500. The vanadium oxide-containing aqueous phase from the strip mixer-settler can be stored in storage tank 460 prior to directing the vanadium oxide-containing aqueous phase to second extraction step 500 (D). The organic phase from product stripper 430 can be directed to acid wash 440 to provide an aqueous phase, which can be directed to raffinate (4b), and an organic phase that can be directed to water wash 450. The organic phase from water wash 450 can be directed to product mixer-settler 420 and the aqueous phase can be directed to raffinate (4c). Organic from product mixer-settler 420 can be provided to product extraction mixer-settler 410.

Figure 5:
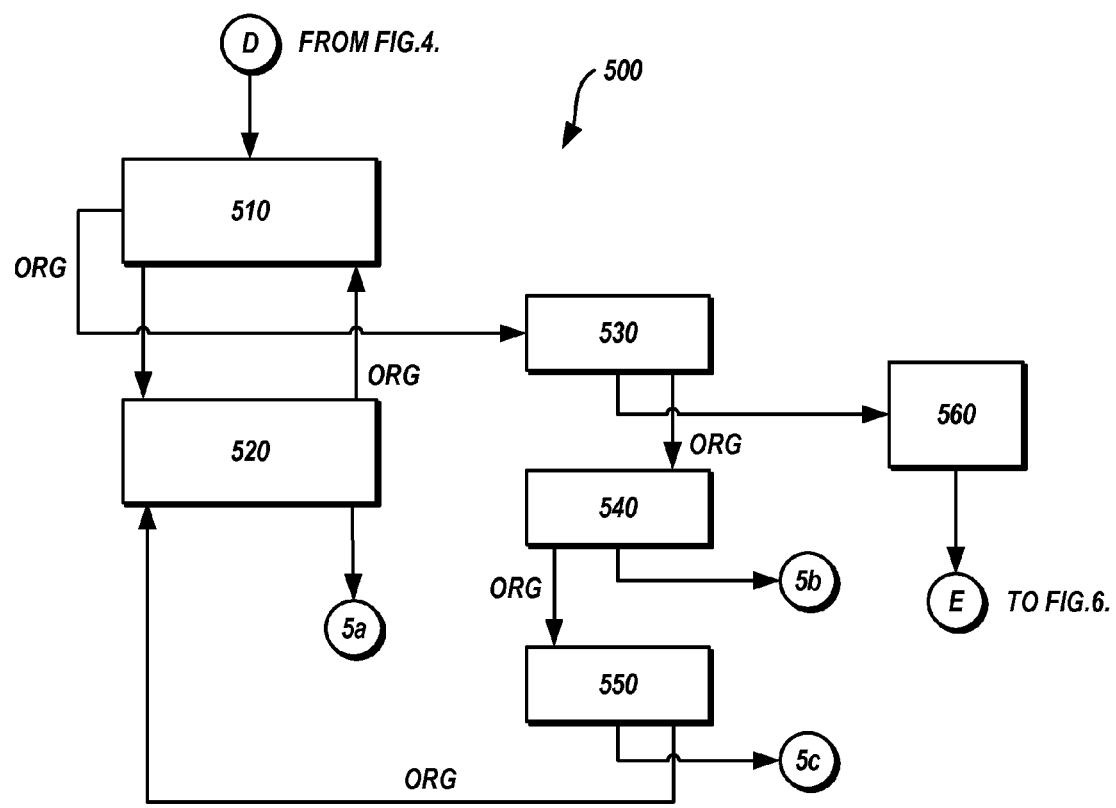
FIG. 5 is a schematic illustration of second extraction step 500.

FIG. 5 illustrates second extraction step 500. Referring to FIG. 5, step 500 includes introducing the vanadium oxide-containing aqueous phase from FIG. 4 (D) to product extraction mixer-settler 510 where the vanadium oxide is extracted into an organic phase. The vanadium oxide-containing organic phase is directed to product stripper 530 that effects redistribution of the organic vanadium oxide into the aqueous phase (acid treatment). The vanadium oxide-containing aqueous phase is then directed to third extraction step 600. The vanadium oxide-containing aqueous phase from the strip mixer-settler can be stored in storage tank 560 prior to directing the vanadium oxide-containing aqueous phase to third extraction step 600 (E). The organic phase from product stripper 530 can be directed to acid wash 540 to provide an aqueous phase, which can be directed to raffinate (5b), and an organic phase that can be directed to water wash 550. The organic phase from water wash 550 can be directed to product mixer-settler 520 and the aqueous phase can be directed to raffinate (5c). Organic from product mixer-settler 520 can be provided to product extraction mixer-settler 510.

Figure 6:
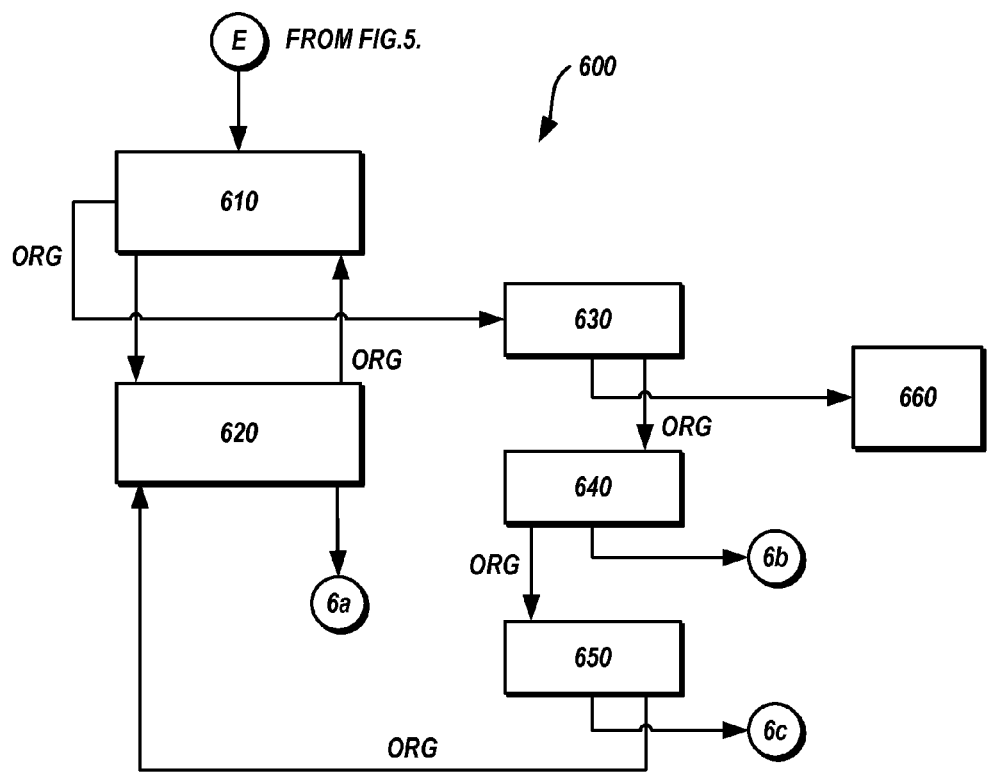
FIG. 6 is a schematic illustration of third extraction step 600.

FIG. 6 illustrates third extraction step 600. Referring to FIG. 6, step 600 includes introducing the vanadium oxide-containing aqueous phase from FIG. 5 (E) to product extraction mixer-settler 610 where the vanadium oxide is extracted into an organic phase. The vanadium oxide-containing organic phase is directed to product stripper 630 that effects redistribution of the organic vanadium oxide into the aqueous phase (acid treatment). In this representative method, the vanadium oxide-containing aqueous phase is the final product. The vanadium oxide-containing aqueous phase from the strip mixer-settler can be stored in storage tank 660. The organic phase from product stripper 630 can be directed to acid wash 640 to provide an aqueous phase, which can be directed to raffinate (6b), and an organic phase that can be directed to water wash 650. The organic phase from water wash 650 can be directed to product mixer-settler 620 and the aqueous phase can be directed to raffinate (6c). Organic from product mixer-settler 620 can be provided to product extraction mixer-settler 610.

It will be appreciated the method described above can be carried out in batch or continuous mode.

In another aspect of the invention, a vanadium oxide product (e.g., an aqueous vanadium oxide solution) is provided. The vanadium oxide product is prepared by the process of the invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A process for purifying vanadium oxide, comprising:
   (a) loading vanadium oxide on a cationic exchange resin by contacting a first vanadium oxide-containing aqueous solution with the resin to provide a cationic exchange resin loaded with vanadium oxide;
   (b) stripping vanadium oxide from the cationic resin loaded with vanadium oxide by contacting the cationic exchange resin loaded with vanadium oxide with acid to regenerate the resin and to provide a second vanadium oxide-containing aqueous solution, wherein the concentration of vanadium oxide in the second solution relative to other cationic metals is greater than in the first solution;
   (c) extracting the second vanadium oxide-containing aqueous solution with an organic solvent comprising a chelating agent to provide an aqueous solution and an organic solvent containing vanadium oxide;
   (d) separating the organic solvent containing vanadium oxide from the aqueous solution; and
   (e) releasing vanadium oxide from the organic solvent by contacting the organic solvent containing vanadium oxide with an aqueous solution to provide a third vanadium oxide-containing aqueous solution, wherein the concentration of vanadium oxide in the third solution relative to other cationic metals is greater than in the second solution.

2. The process of claim 1 further comprising:
   (f) extracting the third vanadium oxide-containing aqueous solution with an organic solvent comprising a chelating agent to provide an aqueous solution and an organic solvent containing vanadium oxide;
   (g) separating the organic solvent containing vanadium oxide from the aqueous solution; and
   (h) releasing vanadium oxide from the organic solvent by contacting the organic solvent containing vanadium oxide with an aqueous solution to provide a fourth vanadium oxide-containing aqueous solution, wherein the concentration of vanadium oxide in the fourth solution relative to other cationic metals is greater than in the third solution.

3. The process of claim 2 further comprising:
   (i) extracting the fourth vanadium oxide-containing aqueous solution with an organic solvent comprising a chelating agent to provide an aqueous solution and an organic solvent containing vanadium oxide;
   (j) separating the organic solvent containing vanadium oxide from the aqueous solution; and
   (k) releasing vanadium oxide from the organic solvent by contacting the organic solvent containing vanadium oxide with an aqueous solution to provide a fifth vanadium oxide-containing aqueous solution, wherein the concentration of vanadium oxide in the fifth solution relative to other cationic metals is greater than in the fourth solution.

4. The process of claim 1, wherein the third vanadium oxide-containing aqueous solution comprises 6% by weight vanadium oxide in water.

5. The process of claim 1, wherein the third vanadium oxide-containing aqueous solution comprises less than 100 ppm other cationic metals.

6. The process of claim 1, wherein the first vanadium oxide containing aqueous solution is produced from a heap leach comprising a vanadium-containing ore.

7. The process of claim 1, wherein the first vanadium oxide containing aqueous solution further comprises iron, zinc, aluminum, sodium, potassium, cadmium, calcium, uranium, nickel, arsenic, antimony, mercury, copper, barium, magnesium, manganese, molybdenum, titanium, zirconium, or strontium ions.

8. The process of claim 1, wherein the first vanadium oxide containing aqueous solution further comprises anions.

9. The process of claim 1, wherein the cationic exchange resin is a strong cationic exchange resin.

10. The process of claim 1, wherein the cationic exchange resin is a hydrogen or sodium cationic exchange resin.

11. The process of claim 1, wherein the chelating agent is an organophosphoric acid.

12. The process of claim 1, wherein the chelating agent is 2-diethylhexaphosphoric acid.

13. The process of claim 1, wherein the organic solvent is a hydrocarbon.

14. The process of claim 1, wherein the organic solvent is a solvent extraction compatible kerosene.

15. The process of claim 1, wherein the organic solvent further comprises a modifier.

16. The process of claim 1, wherein the organic solvent further comprises tri-n-octylphosphine oxide.

* * * * *

UNITED STATES PATENT AND TRADEMARK OFFICE
CERTIFICATE OF CORRECTION

PATENT NO. : 8,871,163 B2
APPLICATION NO. : 13/839136
DATED : October 28, 2014
INVENTOR(S) : Drozd Page 1 of 1

It is certified that error appears in the above-identified patent and that said Letters Patent is hereby corrected as shown below:

In the Claims

Col. 8, Line 34, Claim 3 delete "(i) separating" insert -- (j) separating --

Signed and Sealed this
Twenty-sixth Day of May, 2015

Michelle K. Lee
*Director of the United States Patent and Trademark Office*